United States Patent
Kamata et al.

[11] Patent Number: 6,164,877
[45] Date of Patent: Dec. 26, 2000

[54] FORMED ROTARY CUTTING TOOL HAVING VARYING DIAMETER AND CONSTANT CLEARANCE ANGLE, AND METHOD OF FORMING GROOVE BY USING THE SAME

[75] Inventors: Satoru Kamata; Naomi Tatebe, both of Toyokawa, Japan

[73] Assignee: OSG Corporation, Toyokawa, Japan

[21] Appl. No.: 09/264,705

[22] Filed: Mar. 9, 1999

[30] Foreign Application Priority Data

Mar. 20, 1998 [JP] Japan .................................. 10-072461

[51] Int. Cl.⁷ ...................................................... B23B 27/06
[52] U.S. Cl. ................................ 407/61; 407/62; 82/1.11; 82/13
[58] Field of Search .................................. 407/59, 60, 61, 407/62, 31, 47, 53, 52, 57, 58, 12, 29; 82/13, 1.11

[56] References Cited

U.S. PATENT DOCUMENTS

| Re. 26,544 | 3/1969 | Castro, Sr. | 407/59 X |
|---|---|---|---|
| 3,775,819 | 12/1973 | Ribich | 407/53 X |
| 4,770,567 | 9/1988 | Moriarty | 407/59 |
| 5,908,269 | 6/1999 | Cox | 407/59 |

FOREIGN PATENT DOCUMENTS

| 57-54019 | 3/1982 | Japan . |
|---|---|---|
| 57-127608 | 8/1982 | Japan . |
| 62-68217 | 3/1987 | Japan . |
| 7-11219 U | 2/1995 | Japan . |

*Primary Examiner*—Henry W. H. Tsai
*Attorney, Agent, or Firm*—Oliff & Berridge, PLC

[57] ABSTRACT

A formed rotary cutting tool including; a generally cylindrical body portion having (a) a plurality of flutes which are formed in the body portion to generally axially extend and which are located around the axis so as to be angularly spaced apart from each other, and (b) cutting edges which cooperate with each other to have a diameter that changes in the axial direction, so that the body portion has a desired configuration. The tool is rotated about the axis to form a groove whose configuration corresponds to the desired configuration, in a solid workpiece. Each of the cutting edges is defined by an intersection of a rake face and a flank face which has a predetermined clearance angle that is constant in the axial direction, irrespective of the change of the diameter.

16 Claims, 9 Drawing Sheets

FORMED ROTARY CUTTING TOOL HAVING VARYING DIAMETER AND CONSTANT CLEARANCE ANGLE, AND METHOD OF FORMING GROOVE BY USING THE SAME

The present application is based on Japanese Patent Application No. 10-72461 filed Mar. 20, 1998, the content of which is incorporated hereinto by reference.

BACKGROUND OF THE INVENTION

1. Field of the Invention

The present invention relates in general to a rotary cutting tool, and is more particularly concerned with a formed rotary cutting tool having peripheral cutting edges whose diameter varies in the axial direction.

2. Discussion of the Related Art

In a highly-efficient multi-utility plant, an exhaust heat recovery plant for energy conservation or saving, or other kinds of plants, there is employed a large-scale high-power gas turbine. FIG. 6 is a view showing a part of one example of the gas turbine having a rotary shaft 10 and a multiplicity of blades 14 which cooperate with each other to form a wheel of the turbine. In the outer circumferential surface of the rotary shaft 10, there are formed the same number of grooves 12 as that of the blades 14. Each blade 14 is fitted at one of its opposite longitudinal ends in the corresponding one of the grooves 12. FIG. 7 is an enlarged view in cross section showing each groove 12, which is taken in a plane perpendicular to the axial direction of the rotary shaft 10. The groove 12 has in the cross section a Christmas tree-like shape which is symmetrical with respect to its laterally or widthwise central line S. The width of the groove 12 generally decreases in a radially inward direction from the outer circumferential surface of the rotary shaft 10 towards the axis of the rotary shaft 10, i.e., in the downward direction as seen in FIG. 7. More specifically described, the groove 12 has three laterally enlarged portions 16, 18, 20 which are spaced apart from each other in its depth direction, and which have larger width values than the adjacent portions. Of the three laterally enlarged portions 16, 18, 20, the portion 16 is located nearest to the circumferential surface of the rotary shaft 10, while the portion 20 is located nearest to the axis of the rotary shaft 10, with the portion 18 being located therebetween. The groove 12 has the largest width at the portion 16. Namely, the width of the groove 12 at the portion 16 is enlarged more than at the other two portions 18, 20. The width of the groove 12 at the portion 20 is enlarged less than at the other two portions 16, 18.

The above-described groove 12 having the Christmas tree-like configuration or profile is, in general, formed by a plurality of ordinary end mills or other rotary cutting tools each having a cutting edge or edges on its outer circumferential surface. These rotary cutting tools rotated about the axis are fed in a direction or directions perpendicular to the axis of the cutting tool for thereby forming the groove 12. For example, those cutting tools are used sequentially in a plurality of rough cutting steps (a)–(d) and a finish cutting step (e). The rough cutting steps (a)–(d) are implemented on the workpiece in this alphabetical order, so that a part or parts shaded in FIGS. 8 is cut off or removed in each rough cutting step. The rough cutting steps (a)–(d) are followed by the finish cutting step (e) in which an inner surface of the rough-cut groove is finished, to form the groove 12.

However, this conventional method of cutting or forming the groove 12 requires, as described above, the plurality of cutting tools having different dimensions and configurations and also the plurality of cutting steps, resulting in a prolonged machining time and an accordingly increased machining cost.

SUMMARY OF THE INVENTION

It is therefore a first object of the present invention to provide a cutting tool capable of performing a cutting operation in a single step to form a groove having a Christmas tree-like configuration or other configuration whose width irregularly varies.

It is a second object of the invention to provide a method of efficiently forming such a groove by using only the cutting tool constructed according to the invention, in a reduced machining time and at an accordingly reduced cost.

The above-indicated first object may be attained according to a first aspect of the present invention which provides a formed rotary cutting tool including; a generally cylindrical body portion having (a) a plurality of flutes which are formed in an outer surface of the body portion to extend generally in an axial direction of the body portion and which are located around an axis of the body portion so as to be angularly spaced apart from each other, and (b) a plurality of cutting edges each of which is constituted by one of widthwise opposite edges of a corresponding one of the flutes, the cutting edges cooperating with each other to have a diameter which changes in the axial direction, so that the body portion has a desired configuration, the tool being rotated about the axis to form a groove whose configuration corresponds to the desired configuration, in a workpiece, the tool being characterized in that: each of the cutting edges is defined by an intersection of a rake face and a flank face which has a predetermined clearance angle with respect to a line that is tangent, at a margin of each cutting edge, to a circle in a transverse cross sectional plane perpendicular to the axis, the circle having its center at the axis and a diameter equal to the diameter of the cutting edges, the clearance angle being substantially constant in the axial direction, irrespective of a change of the diameter of the cutting edges.

In the formed cutting tool constructed as described above, the clearance angle of the flank face of each cutting edge is constant over the entire axial length of the cutting edge, irrespective of the change of the diameter. The constant clearance angle of the flank face is effective to assure both a high rigidity at a diametrically small part or parts of the cutting edge and a high cutting performance of a diametrically large part or parts of the cutting edge. If a radial distance (clearance amount) of the flank face from the circumference of the above-indicated circle at a predetermined angular position or phase (for example, at an angular position spaced apart from the margin of the cutting edge by 90° in the circumferential direction of the body portion) is constant throughout the entire length of the cutting edge irrespective of the change of the diameter, the clearance angle changes with the change of the diameter. That is, the clearance angle is inevitably reduced as the diameter increases. The reduced clearance angle in the diametrically large part leads to an insufficient cutting sharpness of the cutting edge, resulting in a reduced cutting performance and a reduced durability of the tool. In view of this, if the above-described radial distance is determined such that the clearance angle in the diametrically large part is suitable for improved cutting performance, the clearance angle at the diametrically small part of the cutting edge (which serves to cut, for example, a laterally narrow portion of the groove 12 interposed between the laterally enlarged portions 18, 20, as shown in FIG. 7) is excessively enlarged. The excessively enlarged clearance angle in the diametrically small part leads to a further reduction in the area of the diametrically small part in cross section perpendicular to the axis, reducing the rigidity and giving rise to a risk of breakage of the diametrically small part.

The clearance angle of the flank face is suitably determined depending upon the diameter of the cutting edges, the material of the workpiece and other factors. Where the diameter is in a range between 7 mm and 24 mm, for example, the clearance angle is preferably selected within a range of about 8–16° and more preferably about 10–14°. If the clearance angle is smaller than 8°, a large friction force is likely to act between the flank face and the cut or machined surface of the workpiece particularly in the diametrically large part, resulting in a reduced cutting performance. If the clearance angle is larger than 16°, on the other hand, it is difficult to obtain a sufficient rigidity of the cutting edge in the diametrically small part.

According to a first preferred form of the first aspect of the invention, the flank face has a substantially arcuate shape in a transverse cross section of the body portion such that a radial distance from the axis to the flank face in the transverse cross section is reduced at a substantially constant rate in a circumferential direction of the body portion away from the each cutting edge.

In this first preferred form, the flank face is represented by a substantially straight line in a view which is obtained by developing or rolling out the transverse cross section about the axis. The substantially straight line intersects a straight line which represents a circumference of the above-described circle, at the clearance angle in the view. The thus formed flank face is effective to provide the cutting edge with a sufficient cutting sharpness, assuring a high rigidity of the cutting edge and a high overall rigidity of the tool.

According to a second preferred form of the first aspect, each of the cutting edges includes at least one corrugated part having, in a cross section thereof taken in a plane containing the rake face, a sinuous shape which consists of a succession of recesses and protrusions arranged alternately at a predetermined pitch in the axial direction, and wherein a phase of the at least one corrugated part of each of the cutting edges is offset from a phase of the at least one corrugated part of any one of the cutting edges other than the each of the cutting edges, in the axial direction.

In this second preferred form, each cutting edge includes the corrugated part or parts having the sinuous shape in the cross section, and each corrugated part of each cutting edge is out of phase with that of any other cutting edge or edges in the axial direction. This second preferred form is effective to brake cutting chips which are produced during a cutting or milling operation, into pieces whose size depends upon the pitch of the recesses and protrusions, thereby preventing the cutting chips from being entangled around the cutting edges and accordingly further improving the cutting performance of the tool. This preferred form is effective to also improve the smoothness of the machined surface of the workpiece. It is noted that the pitch corresponds to a distance between the corresponding points of the adjacent protrusions or recesses.

The phase of the at least one corrugated part of each of the cutting edges may be preferably offset from a phase of the at least one corrugated part of one of the cutting edges which is circumferentially adjacent to the each of the cutting edges, by an amount corresponding to a quotient of the pitch divided by the number of the cutting edges.

According to an advantageous arrangement of the second preferred form of the first aspect of the invention, each of the recesses has a predetermined first radius of curvature while each of the protrusions has a predetermined second radius of curvature, so that the diameter of the cutting edges in the at least one corrugated part smoothly changes. The radius of curvature of each recess and that of each protrusion may be, for example, in a range of 0.3 mm to 0.7 mm, and are preferably about 0.5 mm. The amplitude of the sine wave of the protrusions and the recesses as measured perpendicularly to the flank face, may be, for example, in a range of 0.1 mm to 0.5 mm, and is preferably about 0.3 mm.

According to a third preferred form of the first aspect of the invention, each of the plurality of flutes is twisted about the axis by a predetermined helix angle, so as to extend in a helical direction of the body portion.

In the present preferred form, each cutting edge extends together with the corresponding one of the flutes in the helical direction with the predetermined helix angle. Where the flutes are twisted clockwise as seen in a direction from the proximal end of the body portion towards the distal end of the body portion, for example, the cutting chips passing though the flutes are efficiently moved away from the cutting edges toward the proximal end of the body portion. The width of the margin of each cutting edge as measured in the circumferential direction may be equal to 0.1 mm or less, i.e., substantially zero.

According to a fourth preferred form of the first aspect of the invention, the rake face has a predetermined rake angle with respect to a straight line which passes the axis and which is perpendicular to the line tangent to the circle in the transverse cross sectional plane, the rake angle changing with a change of the diameter of the cutting edges in the axial direction.

According to a fifth preferred form of the first aspect of the invention, the cutting tool further includes a shank portion which is integral with the body portion.

According to an advantageous arrangement of the fifth preferred form of the invention, the diameter of the cutting edges alternately increases and decreases in the axial direction so as to generally decreases in a direction away from the shank portion toward a distal end of the body portion, so that the body portion has at least one diametrically large part and at least one diametrically small part which are alternately arranged in the axial direction, so as to have a Christmas tree-like configuration, the tool being rotated about the axis and moved in a direction perpendicular to the axis to form a groove whose configuration corresponds to the Christmas tree-like configuration, in the workpiece.

The present invention is advantageously applied to the formed rotary cutting tool which is designed to form the groove having the Christmas tree-like configuration, as in this advantageous arrangement of the fifth preferred form of the first aspect of the invention. However, the invention is also applicable to a tapered end mill having peripheral cutting edges whose diameter progressively decreases in a direction toward the distal end of the tool so as to form a substantially isosceles triangle shaped groove whose width linearly decreases in the depth direction, or a milling cutter designed to principally produce a surface perpendicular to its axis, or other formed cutting tools having peripheral cutting edges whose diameter changes in the axial direction.

According to another advantageous arrangement of the fifth preferred form of the invention, each of the cutting edges includes at least one corrugated part having a sinuous shape in a cross section taken in a plane containing the rake face, the at least one corrugated part being provided in a portion of each of the cutting edges in which a rate of change of the diameter of the cutting edges in the axial direction is smaller than that in the other portion of the each of the cutting edges.

The corrugated part provided in each cutting edge does not necessarily extend over the entire length of the cutting edge. That is, the corrugated part may be provided in only the portion of the cutting edge in which the rate of change of the diameter is comparatively small, i.e., the portion particularly required to have a high degree of cutting performance.

The above-indicated second object may be attained according to a second aspect of the present invention which provides a method of forming, in a solid workpiece, a groove which has a configuration having a width changing in a depth direction of the groove and including a plurality of laterally enlarged portions spaced apart from each other in the depth direction, the method comprising: a step of moving a formed rotary cutting tool and the workpiece relative to each other in a single direction which is perpendicular to an axis of the cutting tool, with the cutting tool being rotated about the axis, so that the groove is completely formed to extend in the single direction in the workpiece without using any other cutting tools, the formed rotary cutting tool comprising a generally cylindrical body portion which has at least one cutting edge and a configuration substantially identical with the configuration of the groove.

In the present method, the complicatedly or irregularly shaped groove can be easily and efficiently formed by the rotary cutting tool constructed according to the present invention. For example, even the tree-like groove as shown in FIG. 7 or otherwise shaped groove whose width irregularly changes in the depth direction, can be formed by one-shot feed of the single formed rotary cutting tool of the present invention in a single direction perpendicular to the axis. As described above, the formed cutting tool of the present invention exhibits the excellent cutting performance and has high rigidity at the cutting edges and high overall rigidity, in spite of the diameter of the cutting edges changing in the axial direction. Therefore, the complicatedly shaped groove can be efficiently formed by the formed cutting tool of the invention with a feed rate and other cutting conditions which satisfy practical requirements.

BRIEF DESCRIPTION OF THE DRAWINGS

The above and optional objects, features, advantages and technical and industrial significance of the present invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
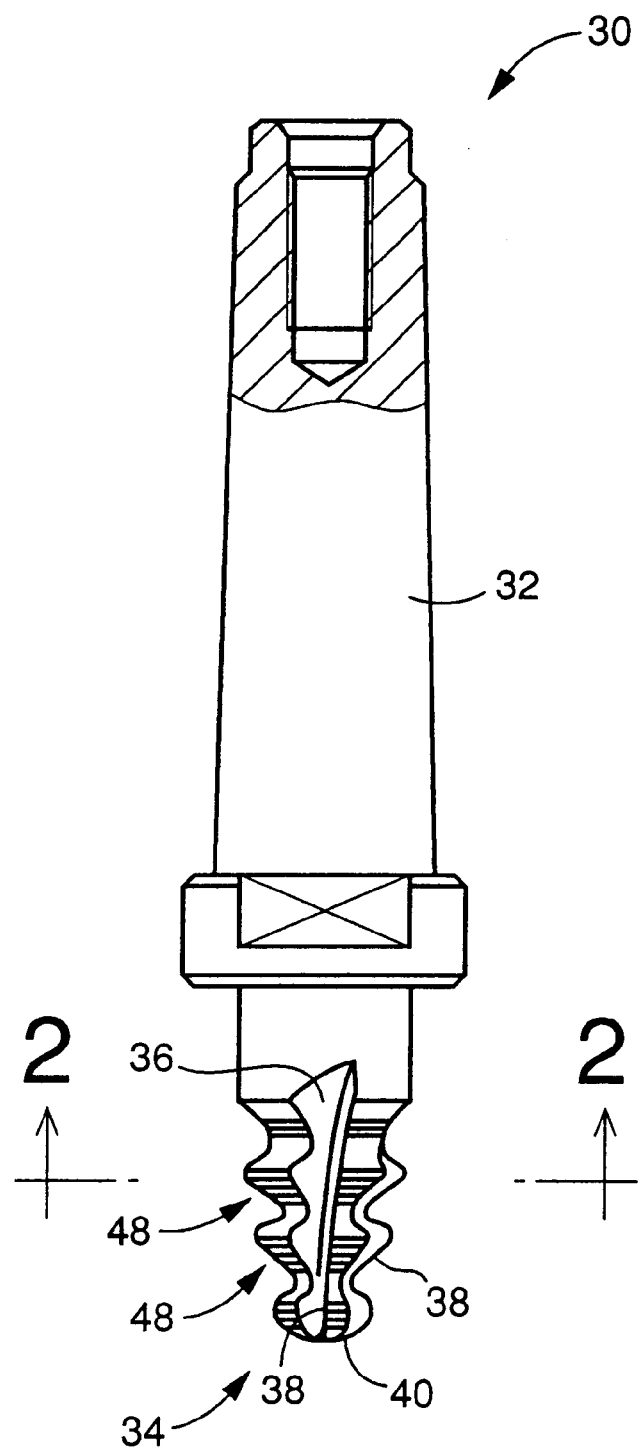
FIG. 1 is a front elevational view partially in cross section of a formed rotary cutting tool, which is constructed according to an embodiment of the present invention.

Referring to FIGS. 1–4, there is shown a formed rotary cutting tool 30 which is constructed according to one embodiment of this invention, so as to be used for forming, in the outer circumferential surface of the rotary shaft 10, tree-like grooves 12 in which respective blades 14 of the turbine wheel are fitted to be fixed to the rotary shaft 10. The formed rotary cutting tool 30 is suitably dimensioned and configured so as to form the grooves 12 each having a depth of about 29.8 mm and different values of width at different portions, namely, about 21.5 mm at its open end, and about 22.3 mm, 17.5 mm and 12.7 mm in its laterally enlarged portions 16, 18, 20, respectively.

Figure 2:
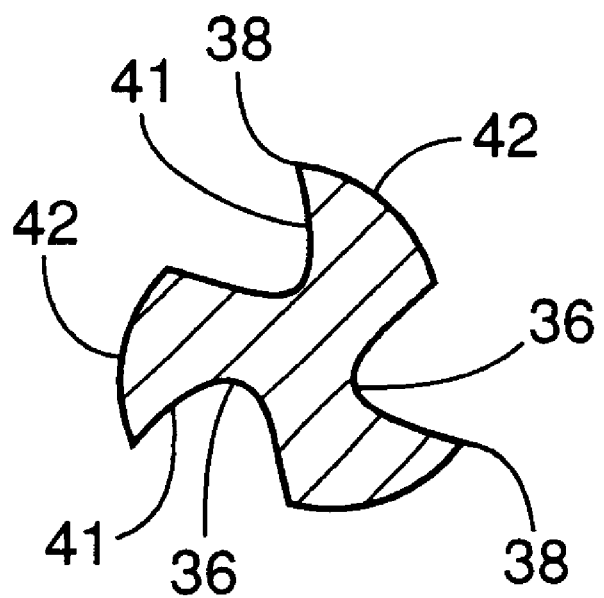
FIG. 2 is a cross sectional view taken along line 2—2 of FIG. 1.

FIG. 1 is a front elevational view partially in cross section showing the formed rotary cutting tool 30, while FIG. 2 is a cross sectional view taken along line 2—2 of FIG. 1. This formed rotary cutting tool 30 has a shank portion 32 and a substantially cylindrical body portion 34 which are integral with each other, and is designed to cut off or remove all of the parts shaded in (a)–(d), in a single step, namely, with a one-shot feed pass or motion thereof relative to the workpiece, to form the groove 12. The body portion 34 has three flutes 36 formed in its outer surface and located around the axis of the body portion 34 so as to be equi-angularly spaced from each other at the angular interval of 120°, so that cutting chips produced during the cutting or milling operation pass through the flutes 36 and removed from the body portion 34. One of the widthwise opposite edges of each flute 36, which is on the downstream side as seen in the rotating direction of the rotary cutting tool 30, serves as a cutting edge for cutting the workpiece, when the cutting tool 30 is driven clockwise as seen in a longitudinal direction away from the shank portion 32 towards the distal end of the body portion 34. Each cutting edge has a peripheral cutting edge portion 38 and an end cutting edge portion 40 which is contiguous to the peripheral cutting edge portion 38. Each flute 36 is twisted about the axis by a helix angle of about 10° so as to extend in the helical direction, more specifically, extend clockwise in the longitudinal direction away from the shank portion 32 towards the distal end of the body portion 34, so that the cutting chips passing though the flute 36 is efficiently removed from the flute 36 toward the shank portion 32. The cutting edges cooperate with each other to have a diameter which alternately increases and decreases, but generally decreases as the cutting edges extend in the longitudinal direction away from the shank portion 32 towards the distal end of the body portion 34, so that the body portion 34 has a configuration or profile corresponding to that of the tree-like shaped groove 12. It is noted that the cutting edges meet each other at the distal end of the body portion 34 so that the diameter of the cutting edges is decreased to substantially zero at the distal end.

Each cutting edge is formed by the intersection of a flank face 42 and a rake face 41 which has a rake angle with respect to a straight line passing the axis of the cutting tool 30 and a nose or margin 44 (FIG. 3) of the cutting edge in a transverse cross sectional plane perpendicular to the axis. The rake angle of the rake face 41 changes with the change of the diameter in the axial direction. The rake angle is about +16° at an axial part of the cutting edge which has the largest diameter and which serves to cut the laterally enlarged portion 16 of the groove 12, as best seen in FIG. 2, and is about −17° at an axial part of the cutting edge which has the smallest diameter and which serves to cut the laterally reduced portion which is interposed between the laterally enlarged portions 18, 20.

Figure 3:
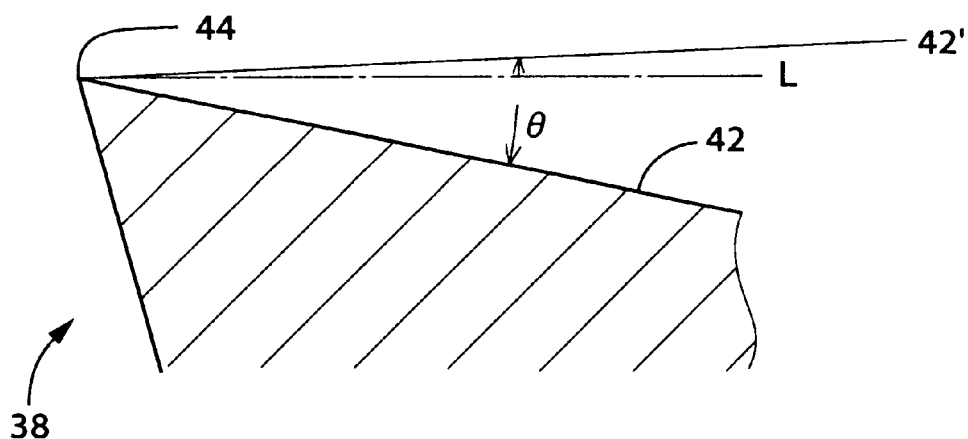
FIG. 3 is a view which is obtained by developing or rolling out a transverse cross section of the formed cutting tool of FIG. 1, about the axis, showing a constant rate of decrease of the radial distance from the axis to a flank face of each cutting edge of the tool in the circumferential direction.

The flank face 42 has a predetermined clearance angle θ with respect to a straight line which is tangent, at the margin 44, to a circle that has its center at the axis of the cutting tool 30 and the same diameter as the cutting tool 30 as measured at the margin 44. The clearance angle θ is held substantially constant in the axial direction, irrespective of the change of the diameter. FIG. 3 is a view of the flank face 42 which is obtained by developing or rolling out the transverse cross section of the formed cutting tool 30, about the axis, showing a rate of decrease of the radial distance from the axis to the flank face 42 of each cutting edge of the cutting tool 30 in the circumferential direction. In this view of FIG. 3, a straight one-dot chain line L represents the circumference of the circle having its center at the axis of the cutting tool 30 and the same diameter as the cutting tool 30 as measured at the margin 44. The flank face 42 is represented by a substantially straight solid line which is designated by the reference numeral 42 and intersects the straight one-dot chain line L at the above-described clearance angle θ. As is clear from this view of FIG. 3, the radial distance from the axis to the flank face 42 is linearly reduced in the circumferential direction of the tool 30, so that the flank face 42 has a substantially arcuate shape in the transverse cross section as shown in FIG. 2. In the present embodiment, the width of the margin 44 of each cutting edge as measured in the circumferential direction is substantially zero, while the clearance angle θ is about 12°.

Figure 4:
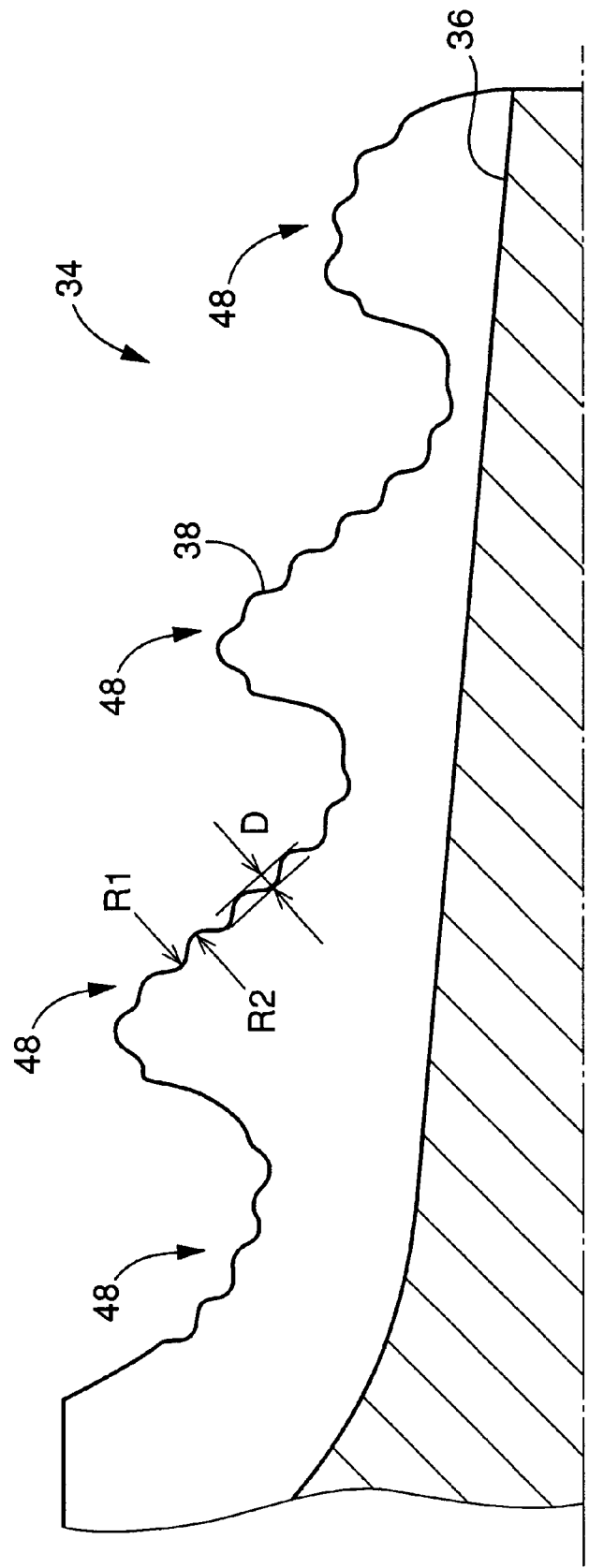
FIG. 4 is a cross sectional view taken in a plane containing a rake face of the cutting edge of the formed cutting tool of FIG. 1.

Each cutting edge includes corrugated parts 48 each having a sinuous shape in cross section taken in a plane containing the rake face, as shown in FIG. 4, so that the diameter at each corrugated part 48 smoothly changes. The corrugated parts 48 may be provided in axial portions of each cutting edge in which a rate of change of the diameter relative to an axial length of the portion is smaller than that in the other axial portions of the cutting edge. In the present embodiment, the corrugated parts 48 are provided in axial portions of each cutting edge in which the diameter progressively decreases in the longitudinal direction away from the shank portion 32 toward the distal end of the body portion 34. The sinuous corrugated part 48 consists of a succession of recesses and protrusions which are alternately formed at a predetermined pitch corresponding to a distance between the corresponding points of the adjacent protrusions or recesses. A height or depth D of the sinuous protrusions and recesses as measured perpendicularly to the flank face 42, is about 0.3 mm. Each recess and each protrusion have predetermined radii R1 and R2 of curvature, respectively, which are both about 0.5 mm.

Figure 9:
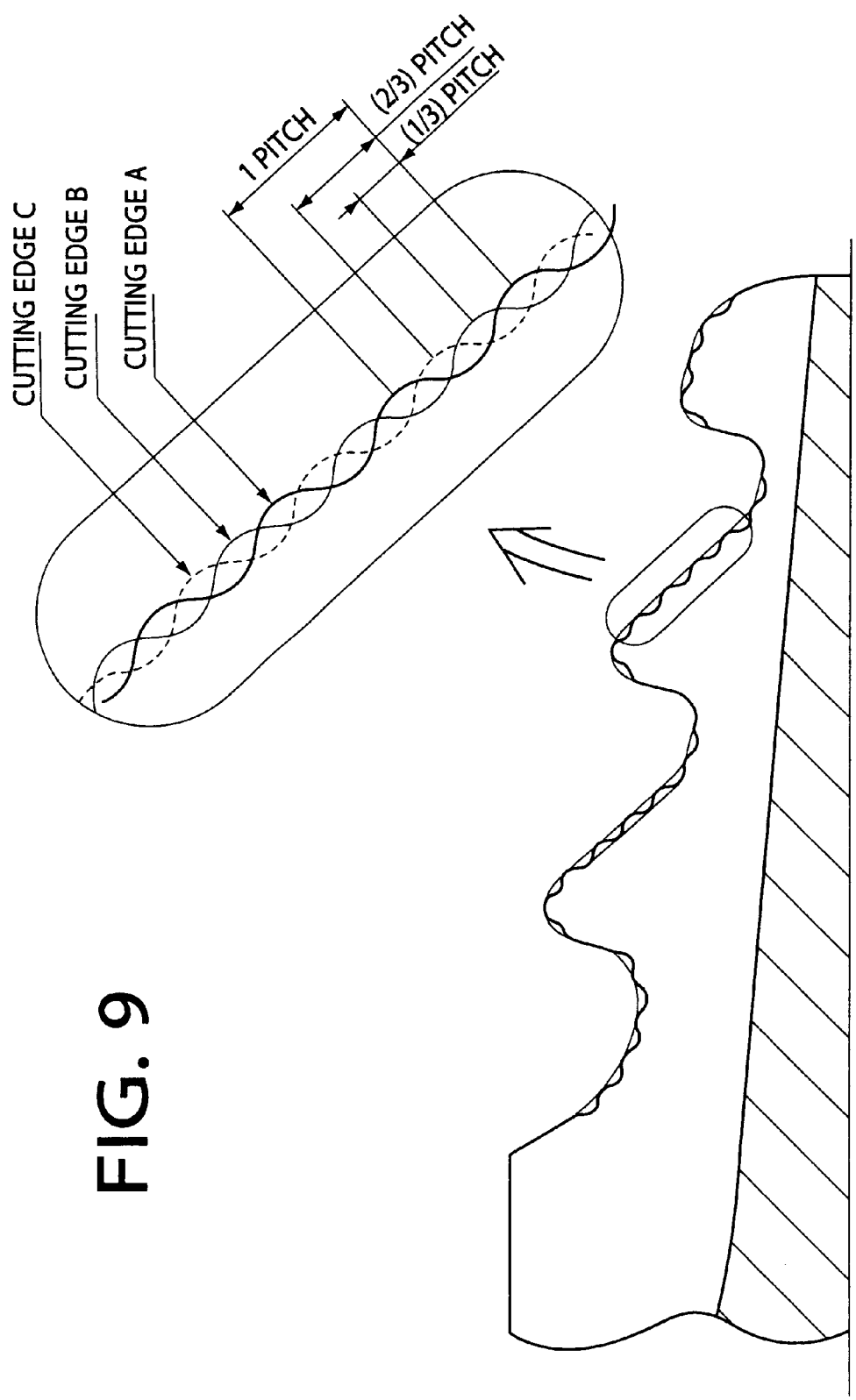
FIG. 9 is a view representing the axial offset distance of the phase of the waves of corrugated parts in the respective cutting edges of the formed cutting tool FIG. 1

The sinuous corrugated parts 48 of each cutting edge is out of phase with those of the other two cutting edges, in the axial direction. More specifically, the phase of the sine wave of the corrugated parts 48 of each cutting edge is offset in the axial direction of the cutting tool 30 relative to those of the other two circumferentially adjacent, by a quotient of the sine wave pitch divided by the number of the cutting edges [by (pitch)/(number of cutting edges)]. In the present embodiment, the axial offset distance of the phase of the sine waves of the corrugated parts 48 of the three cutting edges is equal to one third of the pitch as shown in FIG. 9. It is noted that each corrugated part 48 is formed in the flank face 42, so as to extend from the margin 44 to the downstream end or the heel of the flank face 42 in the circumferential of the rotary cutting tool 30.

In the formed rotary cutting tool 30 of the present invention, the clearance angle θ of the flank face 42 of each cutting edge is held constant at about 12° over the entire axial length of the cutting edge 38, irrespective of the change of the axial diameter. The constant clearance angle θ of the flank face 42 is effective to assure a high rigidity in the diametrically small part of the cutting edge (which serves to cut the laterally narrowed portion of the groove 12 which is interposed between the laterally enlarged portions 18, 20) and also a high cutting performance in the diametrically large part of the cutting edge (which serves to cut the laterally enlarged portion 16 of the groove 12).

Further, the radial distance to the flank face 42 from the axis is progressively reduced in the circumferential direction away from each cutting edge, such that the substantially straight line in FIG. 3 representing the flank surface 42 intersects the straight one-dot chain line L representing the circumference of the above-described circle at the clearance angle θ, as indicated in the view of FIG. 3, so that the flank face 42 has the substantially arcuate shape in the transverse cross section. The thus formed flank face 42 is effective to provide the cutting edge with a sufficient cutting sharpness, assuring a high rigidity of the cutting edge and a high overall rigidity of the cutting tool.

Still further, each cutting edge includes the corrugated parts 48 each having the sinuous shape in the cross section of FIG. 4. Each sinuous corrugated part 48 consists of the succession of recesses and protrusions each having the predetermined radius of curvature, so that the diameter in the corrugated part 48 does not change in steps but changes smoothly. The phase of the sine wave of the corrugated parts 48 of each cutting edge is axially offset from those of the circumferentially adjacent cutting edges by the quotient of the sine wave pitch divided by the number of the cutting edges. Therefore, cutting chips produced in the milling operation is effectively broken into small pieces each having a size determined by the pitch of the sinuous corrugated parts 48, thereby improving the cutting performance of the tool 30. The offset phase arrangement in the corrugated parts 48 is effective to also improve the smoothness of the machined surface of the workpiece.

Figure 7:
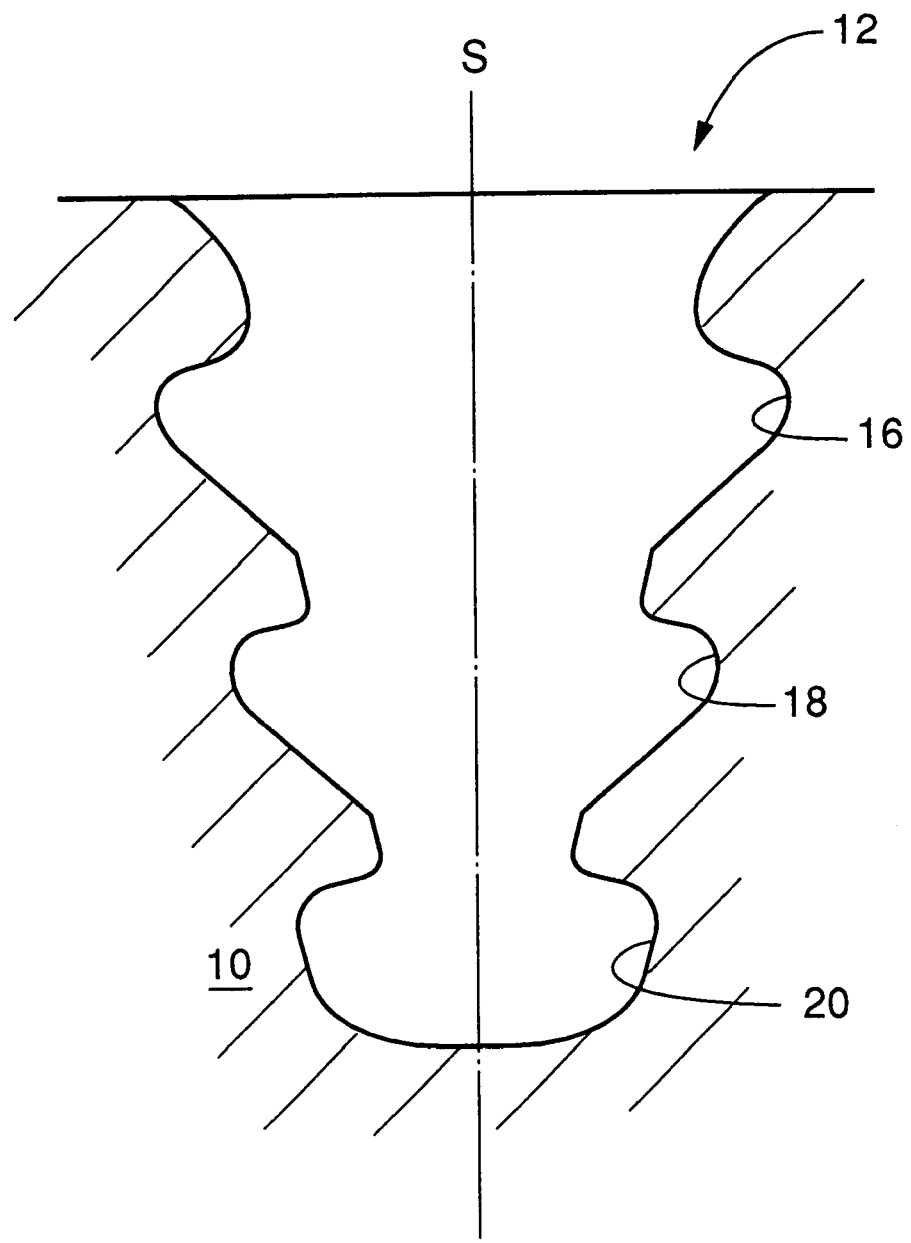
FIG. 7 is an enlarged view showing a cross section of each tree-like groove which is taken in a plane perpendicular to the axial direction of the rotary shaft.
Figure 8A:
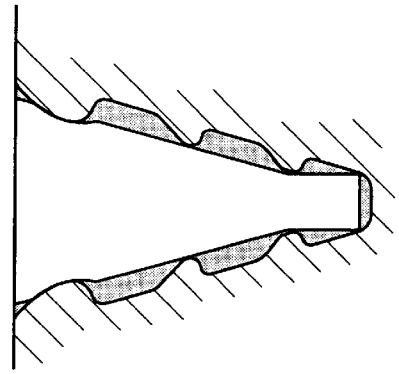
FIGS. 8 are a views explaining a conventional method of forming the tree-like groove of FIG. 7 in a workpiece, in which cutting steps (a)–(e) are implemented in the alphabetical order so that a shaded part or parts is cut in each step.
Figure 8B:
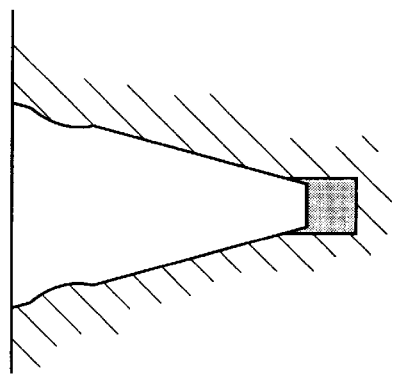
Figure 8C:
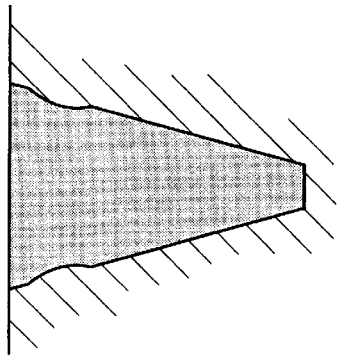
Figure 8D:
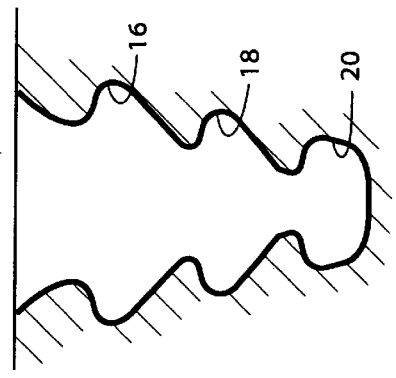
Figure 8E:
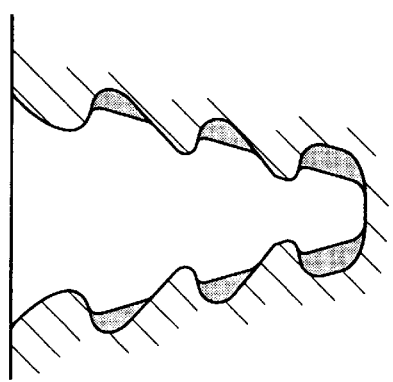

As described above, the formed rotary cutting tool 30 of the present embodiment exhibits the excellent cutting performance, and has the high rigidity of the cutting edges and the entirety of the tool, in spite of the change in the diameter of the cutting edges in the axial direction. The tree-like groove 12 as shown in FIG. 7 or otherwise shaped groove whose width is irregularly changed in the depth direction, can be formed by one-shot feed or a single pass of the single formed rotary cutting tool 30 with a feed rate and other cutting conditions which satisfy practical requirements. It is noted that the formed rotary cutting tool 30 may have dimensions slightly smaller than the nominal dimensions of the groove to be formed, if needed, so that another formed rotary cutting tool having dimensions substantially equal to the nominal dimensions of the groove is additionally employed to finish the inner surface of the groove which

TABLE 1

| Cutting tool | Number of cutting edges | Helix angle | Range of Rake angle | Clearance angle | Form of Nicks |
|---|---|---|---|---|---|
| A-type | 3 | 10° | 16° to −17° | 12° | Nicks 50 |
| B-type | 3 | 10° | 16° to −17° | 12° | Corrugation 48 |

TABLE 2

| Cutting tool | A-type | A-type | A-type | B-type | B-type | B-type | B-type |
|---|---|---|---|---|---|---|---|
| Number of revolutions | 360 r.p.m. | 360 r.p.m. | 360 r.p.m. | 360 r.p.m. | 360 r.p.m. | 360 r.p.m. | 360 r.p.m. |
| Feed rate | 16 mm/min | 24 mm/min | 32 mm/min | 16 mm/min | 24 mm/min | 32 mm/min | 48 mm/min |
| Cutting sharpness | Excellent | Good | Fair | Excellent | Excellent | Excellent | Excellent |
| Vibration | Very Little | Tolerable | Very Much | Very Little | Very Little | Very Little | Little |
| Chatter | Very Little | Very Much | Very Much | Very Little | Very Little | Very Little | Very Little |
| Surface finish | Excellent | Poor | Poor | Excellent | Excellent | Excellent | Good |
| Wear | Very | Very | Very | Very | Very | Very | Very |
| Tool chipping | No | No | No | No | No | No | No |
| Cutting resistance X | 200 kgf | 280 kgf | 340 kgf | 190 kgf | 260 kgf | 300 kgf | 420 kgf |
| Cutting resistance Y | 170 kgf | 300 kgf | 360 kgf | 160 kgf | 200 kgf | 240 kgf | 320 kgf |
| Cutting resistance Z | 30 kgf | 70 kgf | 70 kgf | '30 kgf | 40 kgf | 50 kgf | 70 kgf | has been cut by the present formed rotary cutting tool 30, thereby further improving the surface finish of the groove 12.

Figure 5:
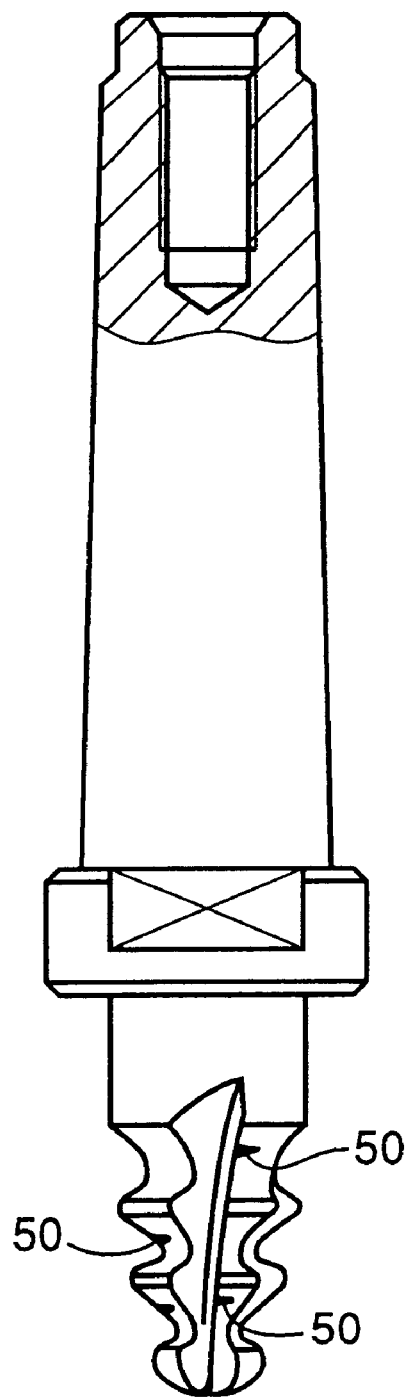
FIG. 5 is a view showing a comparative example in the form of a formed cutting tool which has staggered-arranged nicks.
Figure 6:
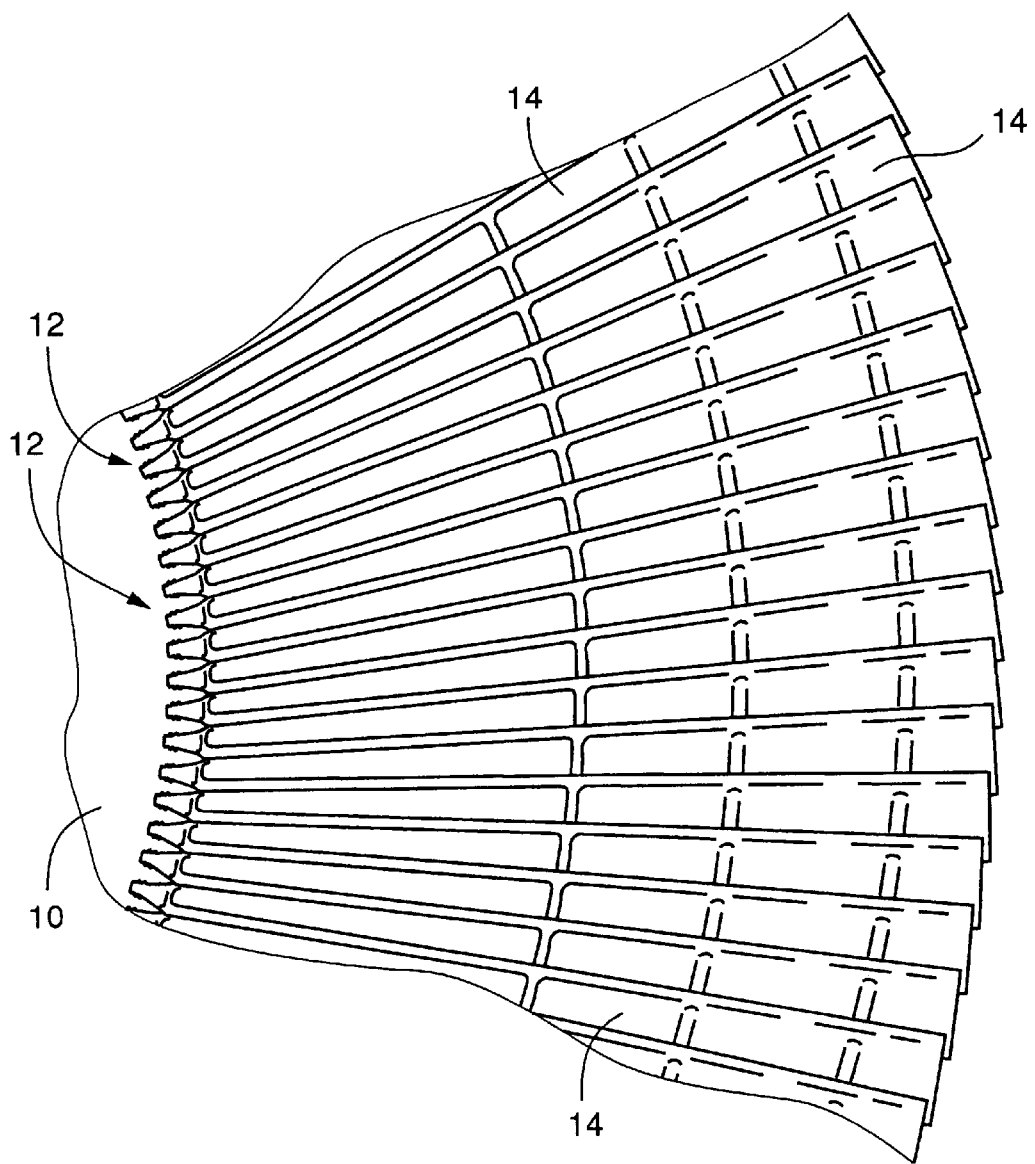
FIG. 6 is a view showing a part of a gas turbine in which a multiplicity of blades are fitted in the respective tree-like grooves formed in the outer circumferential surface of a rotary shaft.

A test was conducted for verifying the cutting sharpness, machined surface and other cutting performance of the formed rotary cutting tool of the present invention. In the test, A-type cutting tool as a comparative sample and B-type cutting tool constructed according to the above-described embodiment were used for forming grooves in a workpiece, with 360 r.p.m. (number of revolutions per minute) at different feed rates, i.e., under cutting conditions as specified below. The A-type cutting tool was identical with the B-type cutting tool of the present invention in sizes and construction, except for form of nicks or corrugations of the cutting edges, as indicated in Table 1. More specifically, the A-type cutting tool was provided with six V-shaped nicks 50 such that two of the V-shaped nicks 50 are formed in each cutting edge, as shown in FIG. 5, while the B-type cutting tool was provided with the nicks in the form of the corrugated parts 48 as described above. The V-shaped nicks 50 of the A-type cutting tool are arranged such that the nicks 50 of the adjacent cutting edges are axially offset from each other, as shown in FIG. 5.

<<Cutting Condition>>

(a) Depth of cut: approximately 30 mm
(b) Material of workpiece: SNCM439 (90HRB)—JIS
(c) Cutting fluid: UH75 (oil, JIS2-5, Yushiro Chemical Industry Co.,Ltd.)
(d) Machine tool: Vertical type machining center MCV-520 (OKK; Osaka Kiko Ltd.)

Table 2 shows a result of the test. The "Cutting sharpness", "Vibration", "Chatter" and "Surface finish" were evaluated, on the basis of the five senses of examiners who conducted the test, into four grades, i.e., "Excellent"–"Good"–"Fair"–"Poor" or "Very Little"–"Little"–"Tolerable"–"Very Much". The "Cutting sharpness" was evaluated by observing the chip removal during the milling operation. The "Vibration" represents the vibration of the entirety of the machine tool which was occurred during the milling operation. The occurrence of the "Chatter" was detected based on the amplitude and tone of the cutting sound. The "Surface finish" was comparatively evaluated by visual appearances of the respective machined surfaces. The cutting resistance X represents a cutting resistance in the direction perpendicular to the direction of extension of the groove. The cutting resistance Y represents a cutting resistance in the direction of extension of the groove. The cutting resistance Z represents a cutting resistance in the depth direction of the formed groove. The cutting resistance in each direction was measured by a strain gauge or other load sensor, and each value (kg f) shown in the table represents the peak load during the milling operation.

As is clear from Table 2, the A-type cutting tool did not exhibit a satisfactory performance at a feed rate higher than 16 mm/min, while the B-type cutting edge exhibited a satisfactory performance even at the feed rate as high as 32 mm/min. That is, the B-type cutting tool permitted the milling operation which is two or more times as efficient as the A-type cutting tool.

Another test was conducted by using C-type cutting tool as a comparative sample and a D-type cutting tool constructed according to the present invention, as shown in Table 3. The cutting tools of these two types were used to form a tree-like groove having depth and width substantially twice as large as those of the above-described groove 12, in a workpiece with 180 r.p.m. at different feed rates, i.e., under cutting conditions as specified below. The C-type cutting tool was identical with the D-type cutting tool of the present invention in size and construction, except for the form of nicks or corrugations, as indicated in Table 3. Table 4 shows a result of the test. As in the above-described test, the "Cutting sharpness", "Vibration", "Chatter" and "Surface finish" were evaluated in the four grades, on the basis of the five senses of the examiners.

<<Cutting Condition>>

(a) Depth of cut: approximately 62 mm
(b) Material of workpiece: SNCM439 (90HRB)—JIS
(c) Cutting fluid: UH75 (oil, JIS2-5, Yushiro Chemical Industry Co.,Ltd.)
(d) Machine tool: Vertical type machining center MCV-520 (OKK; Osaka Kiko Co.,Ltd)

TABLE 3

| Cutting tool | Number of cutting edges | Helix angle | Range of Rake angle | Clearance angle | Form of Nicks |
|---|---|---|---|---|---|
| C-type | 3 | 10° | 16° to −21° | 10° | Nicks 50 |
| D-type | 3 | 10° | 16° to −21° | 10° | Corrugation 48 |

TABLE 4

| Cutting tool | C-type | D-type | D-type | D-type | D-type |
|---|---|---|---|---|---|
| Number of revolutions | 180 r.p.m. | 180 r.p.m. | 180 r.p.m. | 180 r.p.m. | 180 r.p.m. |
| Feed rate | 10 mm/min | 10 mm/min | 20 mm/min | 30 mm/min | 40 mm/min |
| Cutting sharpness | Poor | Fair | Fair | Fair | Fair |
| Vibration | Very Much | Tolerable | Tolerable | Tolerable | Tolerable |
| Chatter | Very Much | Little | Little | Tolerable | Tolerable |
| Surface finish | Poor | Good | Good | Good | Fair |
| Wear | Very Little | Very Little | Very Little | Very Little | Very Little |
| Tool chipping | No | No | No | No | No |
| Cutting resistance X | 360 kgf | 500 kgf | 600 kgf | 700 kgf | 900 kgf |
| Cutting resistance Y | 700 kgf | 450 kgf | 700 kgf | 900 kgf | 1200 kgf |
| Cutting resistance Z | 180 kgf | 100 kgf | 160 kgf | 180 kgf | 200 kgf |

As is clear from Table 4, the C-type cutting tool did not exhibit a satisfactory performance even at a feed rate of 10 mm/min, while the D-type cutting edge exhibited a satisfactory performance even at a feed rate as high as 40 mm/min.

While the presently preferred embodiment of the present invention has been described above for illustrative purpose only, it is to be understood that the present invention is not limited to the details of the above-described embodiment but may be embodied with various changes, modifications and improvements.

For example, while the formed rotary cutting tool 30 of the above-illustrated embodiment has three cutting edges, the number of the cutting edges may be suitably changed.

While each flute 36 formed in the formed rotary cutting tool 30 extends in the helical direction, the flute 36 may be formed to extend in parallel with the axis so that each cutting edge also extends in the axial direction.

While each cutting edge in the formed cutting tool 30 is constituted by the corresponding part of the body portion 34, the cutting edge may be constituted by a cutting insert or inserts which is removable from the body portion 34.

It is to be understood that the present invention may be embodied with various other changes, modifications and improvements, which may occur to those skilled in the art, without departing from the spirit and scope of the present invention defined in the following claims:

What is claimed is:

1. A formed rotary cutting tool comprising; a generally cylindrical body, portion having; (a) a plurality of flutes which are in an outer surface of said body portion to extend generally in an axial direction of said body portion and which are located around an axis of said body portion so as to be angularly spaced apart from each other, and (b) a plurality of cutting edges each of which is constituted by one of widthwise opposite edges of a corresponding one of said flutes, said cutting edges cooperating with each other to have a diameter which changes in said axial direction, so that said body portion has a desired configuration, said tool being rotated about said axis to form a groove whose configuration corresponds to said desired configuration, in a workpiece, wherein said diameter of said cutting edges alternately increases and decreases in said axial direction, so that said body portion has at least one diametrically large part and at least one diametrically small part which are alternately arranged in said axial direction, and wherein each of said cutting edges is defined by an intersection of a rake face and a flank face which has a predetermined clearance angle with respect to a line that is tangent, at a margin of said each cutting edge, to a circle in a transverse cross sectional plane perpendicular to said axis, said circle having its center at said axis and a diameter equal to said diameter of said cutting edges, said clearance angle being constant in said axial direction, irrespective of a change of said diameter of said cutting edges.

2. A formed rotary cutting tool according to claim 1, wherein said flank face has a substantially arcuate shape in a transverse cross section of said body portion such that a radial distance from said axis to said flank face in said transverse cross section is reduced at a substantially constant rate in a circumferential direction of said body portion away from said each cutting edge.

3. A formed rotary cutting tool according to claim 1, wherein said each of said cutting edges includes at least one corrugated part having, in a cross section thereof taken in a plane containing said rake face, a sinuous shape which consists of a succession of recesses and protrusions arranged alternately at a predetermined pitch in said axial direction, and wherein said sinuous shape of said corrugated part in each cutting edge is out of phase with that in any one of said cutting edges other than said each cutting edge, in said axial direction.

4. A formed rotary cutting tool according to claim 3, wherein a phase of said sinuous shape of said corrugated part in said each cutting edge is offset from that in one of said cutting edges which is circumferentially adjacent to said each cutting edge, by an amount corresponding to a quotient of said pitch divided by the number of said cutting edges.

5. A formed rotary cutting tool according to claim 3, wherein each of said recesses has a predetermined first radius of curvature while each of said protrusions has a predetermined second radius of curvature, so that said diameter of said cutting edges in said at least one corrugated part smoothly changes.

6. A formed rotary cutting tool according to claim 1, wherein each of said plurality of flutes is twisted about said axis by a predetermined helix angle, so as to extend in a helical direction of said body portion.

7. A formed rotary cutting tool according to claim 1, wherein said rake face has a predetermined rake angle with respect to a straight line which passes said axis and which is perpendicular to said line tangent to said circle in said transverse cross sectional plane, said rake angle changing with a change of said diameter of said cutting edges in said axial direction.

8. A formed rotary cutting tool according to claim 1, further comprising a shank portion which is integral with said body portion.

9. A formed rotary cutting tool according to claim 8, wherein said diameter of said cutting edges alternately increases and decreases in said axial direction so as to generally decrease in a direction away from said shank portion toward a distal end of said body portion, so that said body portion has at least one diametrically large part and at least one diametrically small part which are alternately arranged in said axial direction, so as to have a Christmas tree-like configuration, said tool being rotated about said axis and moved in a direction perpendicular to said axis to form a groove who se configuration corresponds to said Christmas tree-like configuration, in said workpiece.

10. A formed rotary cutting tool according to claim 9, wherein said each of said cutting edges includes at least one corrugated part having a sinuous shape in a cross section taken in a plane containing said rake face, said at least one corrugated part being provided in a portion of said each of said cutting edges in which a rate of change of said diameter of said cutting edges in said axial direction is smaller than that in the other portion of said each of said cutting edges.

11. A formed rotary cutting tool according to claim 1, wherein said plurality of cutting edges meet each other at a distal end of said body portion.

12. A formed rotary cutting tool according to claim 1, wherein said diameter of said cutting edges alternately increases and decreases in said axial direction so as to generally decrease in a direction away from a proximal end of said body portion toward a distal end of said body portion, so that said body portion has at least one diametrically large part and at least one diametrically small part which are alternately arranged in said axial direction, so as to have a Christmas tree-like configuration, said tool being rotated about said axis and moved in a direction perpendicular to said axis to form a groove whose configuration corresponds to said Christmas tree-like configuration, in said workpiece.

13. A method of forming by using the formed rotary cutting tool defined in claim 1, in a solid workpiece, a groove which has a configuration corresponding to said desired configuration of said body portion of said rotary cutting tool, said method comprising:

a step of moving said formed rotary cutting tool and said workpiece relative to each other in a single direction which is perpendicular to said axis of said body portion of said cutting tool, with said cutting tool being rotated about said axis, so that said groove is completely formed to extend in said single direction in said workpiece without using any other cutting tools.

14. A method of forming by using the formed rotary cutting tool defined in claim 7, in a solid workpiece, a groove which has a configuration corresponding to said desired configuration of said body portion of said rotary cutting tool, said method comprising:

a step of moving said formed rotary cutting tool and said workpiece relative to each other in a single direction which is perpendicular to said axis of said body portion of said cutting tool, with said cutting tool being rotated about said axis, so that said groove is completely formed to extend in said single direction in said workpiece without using any other cutting tools.

15. A method of forming by using the formed rotary cutting tool defined in claim 9, in a solid workpiece, a groove which has a configuration corresponding to said Christmas tree-like configuration of said body portion of said rotary cutting tool, said method comprising:

a step of moving said formed rotary cutting tool and said workpiece relative to each other in a single direction which is perpendicular to said axis of said body portion of said cutting tool, with said cutting tool being rotated about said axis, so that said groove is completely formed to extend in said single direction in said workpiece without using any other cutting; tools.

16. A method of forming by using the formed rotary cutting tool defined in claim 12, in a solid workpiece, a groove which has a configuration corresponding to said Christmas tree-like configuration of said body portion of said rotary cutting tool, said method comprising:

a step of moving said formed rotary cutting tool and said workpiece relative to each other in a single direction which is perpendicular to said axis of said body portion of said cutting tool, with said cutting tool being rotated about said axis, so that said groove is completely formed to extend in said single direction in said workpiece without using any other cutting tools.

\* \* \* \* \*